United States Patent [19]

Riddell, III et al.

[11] Patent Number: 4,915,487
[45] Date of Patent: Apr. 10, 1990

[54] HEADS UP DISPLAY FOR NIGHT VISION GOGGLE

[75] Inventors: James Riddell, III, Bellbrook; David C. Lambertson, Dayton, both of Ohio

[73] Assignee: Systems Research Laboratories, Dayton, Ohio

[21] Appl. No.: 305,000

[22] Filed: Feb. 1, 1989

[51] Int. Cl.⁴ ............ G02B 27/14; G02B 23/10; G02B 23/12
[52] U.S. Cl. .................. 350/174; 350/538; 350/545
[58] Field of Search ............ 350/171, 174, 545, 538, 350/569; 340/705; 250/330

[56] References Cited

U.S. PATENT DOCUMENTS

| | | | |
|---|---|---|---|
| 3,672,782 | 6/1972 | Akin | 350/174 |
| 4,000,419 | 12/1976 | Crost et al. | 250/213 VT |
| 4,012,123 | 3/1977 | Fuller | 350/174 |
| 4,274,149 | 6/1981 | Flanagan | 350/174 |
| 4,556,284 | 12/1985 | Albersdoerfer et al. | 350/174 |
| 4,630,900 | 12/1986 | Steiner | 350/174 |
| 4,818,065 | 4/1989 | Ziph et al. | 350/174 |

Primary Examiner—Bruce Y. Arnold
Assistant Examiner—Ronald M. Kackmarik
Attorney, Agent, or Firm—Biebel, French & Nauman

[57] ABSTRACT

Conventional night vision goggles are provided with heads-up display information at the same focus and in the same field of view as the intensified image. The heads-up display information is typically generated by a remotely located cathode ray tube and transferred to the goggles by a fiber optic cable where it is then introduced into one of the eyepieces, which eyepiece is modified to include an image combiner placed inside its outer lens in order to provide substantially the same eye relief and physical dimensions as an unmodified eyepiece. The image combiner is a partially reflective mirror. Additional lenses are provided between the heads-up display and the beam combiner to insure that this additional information is presented to the eye at the same focus as the intensified image.

4 Claims, 3 Drawing Sheets

HEADS UP DISPLAY FOR NIGHT VISION GOGGLE

BACKGROUND OF THE INVENTION

The present invention relates to an apparatus for providing heads up display imagery to an airman wearing night vision goggles.

Night flying in fixed wing and rotary wing aircraft has become an important and viable tactic in modern warfare, particularly since the advent of the Generation III AN/AVS-6 (ANVIS-6) night vision goggle. These night vision goggles are virtually the only U.S. made night vision goggles designed for use in piloting aircraft, with over 20,000 units ultimately scheduled for manufacture.

The goggle optics are typically focused at infinity to view terrain in front of the aircraft, thus it is almost impossible to read the cockpit instrumentation clearly. Further, the new generation of cockpit lighting is designed to be non-visible to these night vision goggles. Looking under the goggles is difficult since instrumentation may be obscured by the goggle housing and the eyes must be refocused from infinity to a few feet to view cockpit displays and then back to infinity to view the outside scene through the goggle. In addition, diversion of the pilot's attention from the outside world to instrumentation is dangerous in a low level, high speed or close formation flight regime.

A heads-up display mounted on night vision goggles is clearly the best method to provide aircraft information or other sensor information to the pilot without diverting his attention from his flying tasks. The prior art solution to this problem has been to use an instrument panel mounted heads-up display which is fixed in position and must be looked at directly for information to be viewed. Panel mounted heads-up displays are expensive and installation is difficult on smaller aircraft, particularly when retro-fit is required.

Helmet mounted displays also require diverting the operator's attention from the external field-of-view. Mounting the heads-up display on the night version goggles is thus the only practical way to achieve continuous monitoring of aircraft and sensor data while the pilot or other operator observes the external scene.

Several methods have been proposed to inject imagery into the operator's field of view while wearing night vision goggles. One method utilizes a beam or image combiner or splitter in front of one of the night vision goggle's objective lenses so that the heads-up display image is amplified by the night vision goggles image intensifier along with the scene information. However, there are three basic disadvantages of this technique, namely (1) night vision goggles tube failure or blooming on the heads-up display side of the goggle will cause loss of the heads-up display information, (2) the heads-up display information will be the same color as the night vision goggles scene, thus making it difficult to discriminate that information from the scene, and (3) resolution of the heads-up display imagery is limited by the night vision goggles objective lens and amplifier tube.

Another prior art device proposes the use of an image combiner between the eye and the night vision goggles eyepiece or ocular. This technique makes it possible to have the heads-up display information in a color that contrasts with the night vision goggles image and heads-up display information will not be lost if the night vision goggles tube fails. Unfortunately, interposing the image combiner and the associated housing between the operator's eye and the night vision goggles ocular brings the heads-up display eyepiece unacceptably close to the operators eye, precluding the wearing of chemical warfare eye protection, such as the M-43 mask, or standard corrective lenses or spectacles. If the eye relief were increased on the heads-up display side to accommodate eye protection goggles or corrective spectacles, the other side without the heads-up display may exceed its eye relief. However, the greatest limitation of an image combiner interposed between the ocular and the eye is the restriction on the maximum field of view. This is due to constraints on the focusing optics between a fiber optics cable carrying the heads-up display information and the image combiner, and the relationship between image combiner size and field of view. Under these circumstances, the maximum practical field of view is approximately a 14 degree circle. This is too small when compared to the basic 40 degree field of view of the night vision goggles, thus reducing the area available for heads-up display information and cluttering the center of the night vision goggles scene.

SUMMARY OF THE INVENTION

The present invention relates to an apparatus that is installed directly on existing night vision goggles to permit additional or heads-up display information to be displayed at the same distance and with the same field of view as the terrain display. The field of view and the distance between the eye and the ocular are not changed, thereby permitting the use of spectacles or chemical defense goggles. In addition a 30°-32° field of view heads-up display image is readily obtainable.

In this invention, heads-up display imagery to night vision goggles is introduced inside the eyepiece of the night vision goggles itself. In doing this, only the eyepiece is modified while the main body or housing of the night vision goggles remains unchanged. In addition, installation of the eyepiece with the intra-lens heads-up display is identical to the installation of the standard eyepiece, that is, it is threaded on to the night vision goggles housing until the night vision goggles image appears at infinity with an eyepiece diopter setting of zero and the same or similar locking ring is then tightened to prevent heads-up display eyepiece rotation. Nitrogen purging of the volume between the rear heads-up display eyepiece lens and the night vision goggles image plane is accomplished in the same manner as the standard lens, completing the installation. De-installation of the intra-lens heads-up display and replacing the standard eyepiece is simply the reverse of the above procedure, requiring no repair or rework of the basic night vision goggles housing.

With this device, degradation of the night vision goggles imagery through the intra-lens heads-up display eyepiece is minimized. Proper optical design of the lenses and image combiner in the night vision goggles image path permits scene visibility which is, to the eye, of comparable quality and brightness to that of the non-heads-up display eyepiece. Since a minimum of extra components are added to the existing goggle, excess weight and resulting balance problems are minimized.

The intra-lens heads-up display of this invention poses no interference problems with basic night vision goggles functions, including interpupillary distance adjustment and external emission of energy. No connection between the right and left eyepieces are required and the interpupillary drive knob is unobstructed, hence the present positive drive system will function normally. All heads-up display imagery injection is contained internally through tight fitting connections, precluding light emissions visible to the enemy or other crew members.

It is therefore an object of this invention to provide an improved method of and apparatus for presenting heads-up display information in night vision goggles by introducing such information inside at least one eyepiece or ocular while maintaining the same focus as the intensified image from the night vision goggle display.

It is further object of this invention to provide an attachment for an existing night vision goggle assembly for presenting a heads-up display of additional information at the same focus and in the same field of view as the intensified image generated by the night vision goggles wherein the goggles include a pair of objective lenses, a pair of image intensifiers for receiving the images in the field of view focused thereon by said objective lenses, and a pair of eyepieces each including a housing containing an inner lens and an outer lens for directing the intensified image into the eyes of the wearer, said attachment including means for modifying at least one of said eyepieces to include a image combiner positioned between the eyepiece inner and outer lenses, means for generating a real image of additional information to be presented to the wearer, and focusing means for presenting said additional image to the wearer at the same focus and in the same field of view as the intensified image.

These and other objects of the invention will be apparent from the following description, the accompanying drawings and the appended claims.

DESCRIPTION OF THE PREFERRED EMBODIMENT

Figure 1:
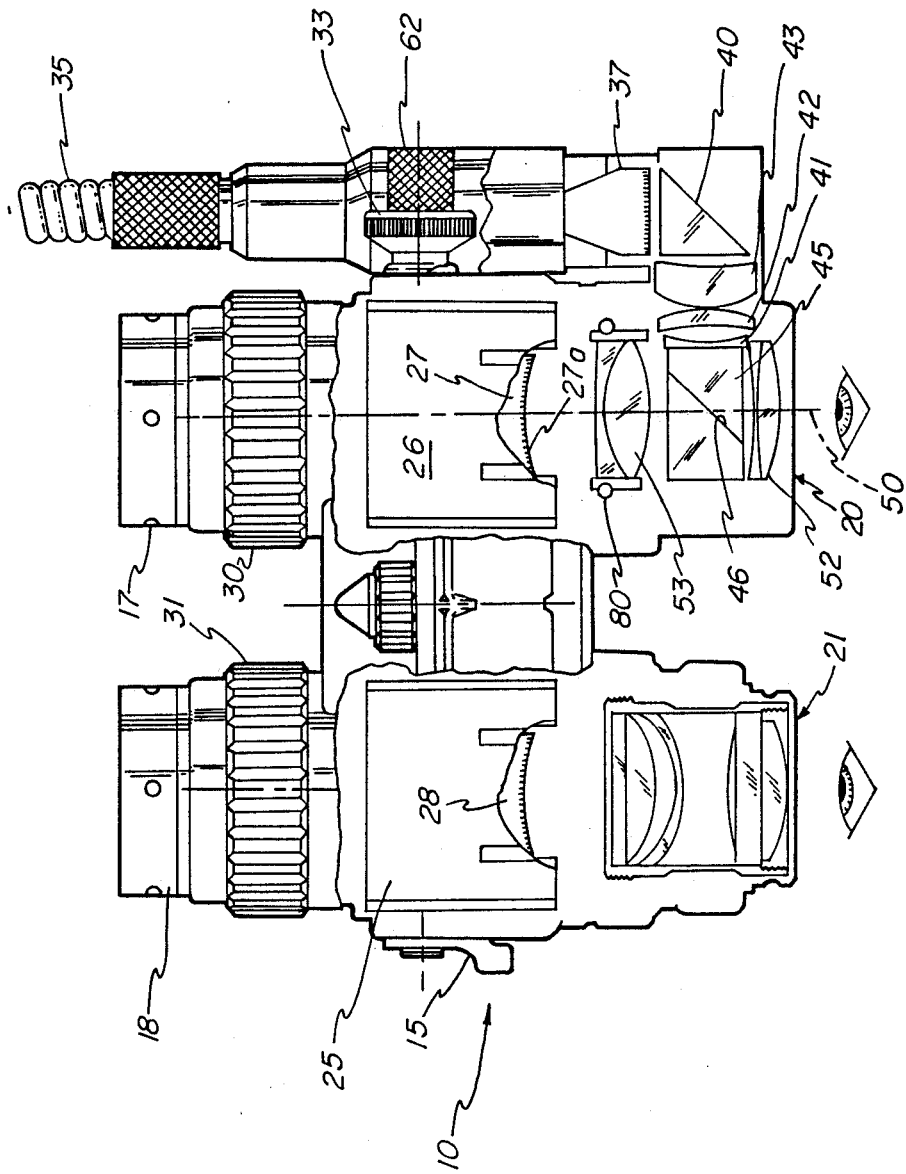
FIG. 1 is a plan view of night vision goggles including a heads-up display installed in the right eyepiece.

Referring now to the drawings, which illustrate a preferred embodiment of the invention, and particularly to FIG. 1, the ANVIS-6 night vision goggle, shown generally at 10, includes a main housing assembly 15, a pair of objective lenses 17 and 18, and a pair of eyepieces or oculars 20 and 21.

The objective lenses 17 and 18 focus an image within their field of view onto conventional image intensifiers 25 and 26, also contained within the housing 15. The output of the image intensifiers, which are inverted, pass through corresponding fiber optic twister assemblies 27 and 28, which erect the image for viewing by the operator through the eyepieces 20 and 21.

Focus control rings 30 and 31 adjust the focus of the scene through the objective lenses 17 and 18 onto the image intensifiers 25 and 26. For normal operation, the focus would be set at infinity. An interpupillary adjustment knob 33 controls the spacing between the eyepieces.

The left eyepiece 21, as viewed in FIG. 1, is a standard eyepiece lens normally associated with the night vision goggle. This eyepiece provides a 400° circular field of view. This eyepiece has a separate focus control, not shown, which permits the operator to correct for individual variations in seeing. For example, in a typical night vision goggle, this adjustment is in the order of +2 to −6 diopter.

The right eyepiece 20, on the other hand, is specially constructed to provide the same field of view, and therefore essentially the same image of the intensifier output 27a as the left eyepiece, but also to display the heads-up display information. It is to be understood that, while the description of this invention refers to the right the heads-up display could installed on the left side, with appropriate modifications to insure proper orientation of the displayed information.

In a normal installation, a cathode ray tube (CRT), or some similar imaging device, provides the additional or heads-up display information simultaneously with the intensified image. This display is usually in a different color from the intensified image to prevent confusion, and could be in multiple colors, if desired. The CRT display is transferred from a remote location, not shown, to the night vision goggles 10 by means of a fiber optic cable 35. This cable typically is a 400×400 glass fiber coherent fiber optic cable in a 4 mm×4 mm square format. This cable has a 3.6 mm×3.6 mm active imagery area which is expanded to 11.5 mm×11.5 mm by a fiber optics bean expander or taper 37. A real image of the additional image is thus present on the surface of the taper 37. A silvered glass prism 40 is used to turn this real image 90° so the fiber optic cable 35 lies parallel to the night vision goggles main body 15, as shown in FIG. 1.

Focusing or relay optics, including three airspaced glass singlets 41, 42 and 43, and a beam combiner 45 cooperates with the eyepiece optics to form a heads-up display image focused at infinity for the eye. The beam combiner 45 is a 13 mm thick circular two piece glass slab, 24 mm in diameter, with a 11.62 mm square flat on the side facing the heads-up display imagery focusing optics. A partially reflecting/partially transmitting coating is applied to one of the surfaces 46 such that the surface transmits 70% of the P-20 phosphor light from the night vision goggles while reflecting 25% of the amber (P-38 type) phosphor light from the CRT, with 5% loss. The partially reflecting surface 46 must be exactly at 45° to both the heads-up display and night vision goggles imagery beam axis 50, with its physical center at the optical centerline of both the heads-up display and night vision goggles image planes.

A high efficiency beam combiner plus the redesigned eyepiece optics provides about 80% of the transmission of an unmodified lens. A 20% difference in scene luminance between the right and left eye is generally not objectionable.

The eyepiece optics in the right eyepiece 20 include two centered doublets, an outer lens 52 and an inner lens 53 on either side of the beam combiner 45, as shown in FIG. 1. Both doublets are round, with 24 mm diameters.

Figure 2:
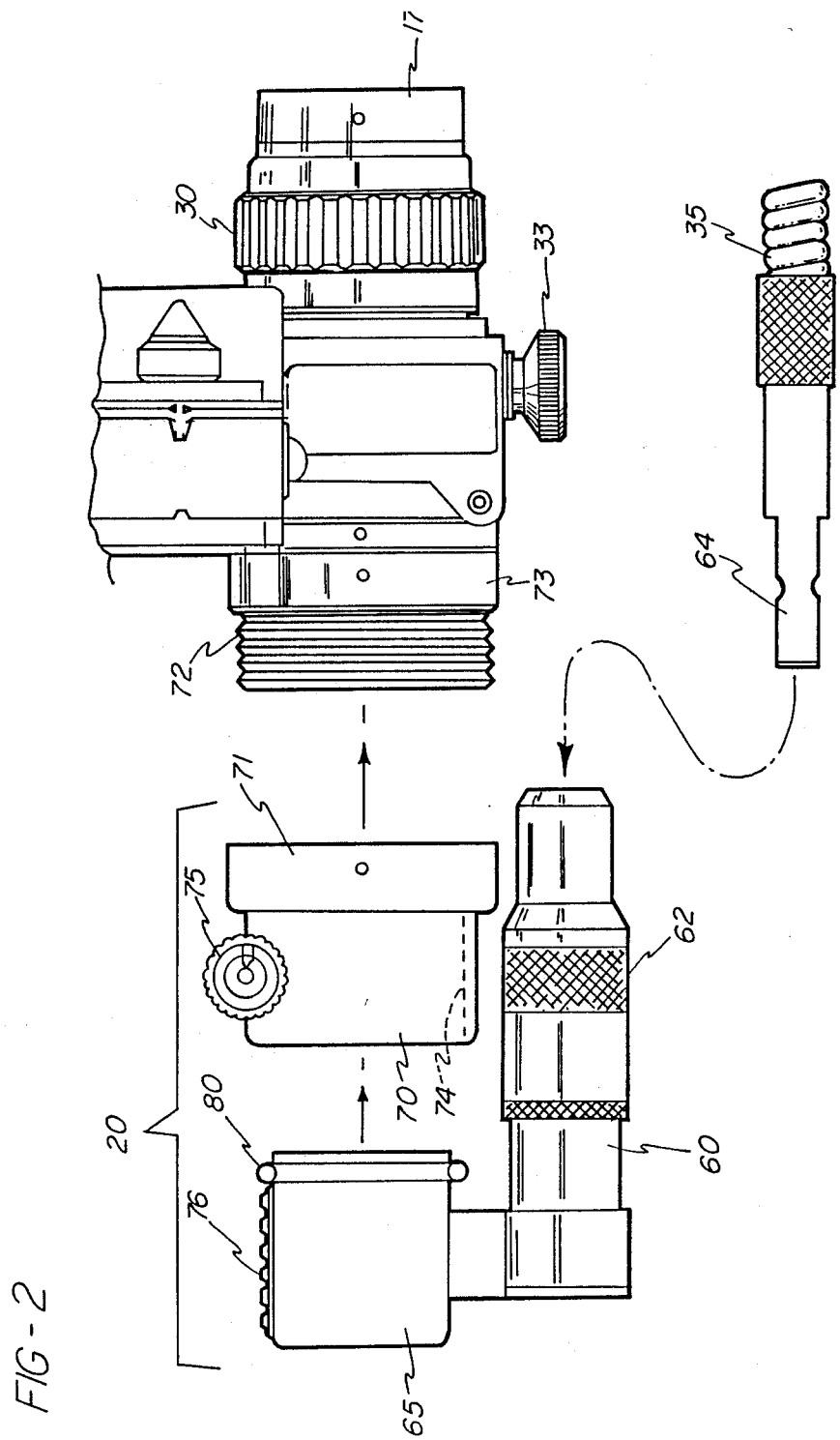
FIG. 2 is an exploded plan view showing the installation of the heads-up display on the right eyepiece.
Figure 3:
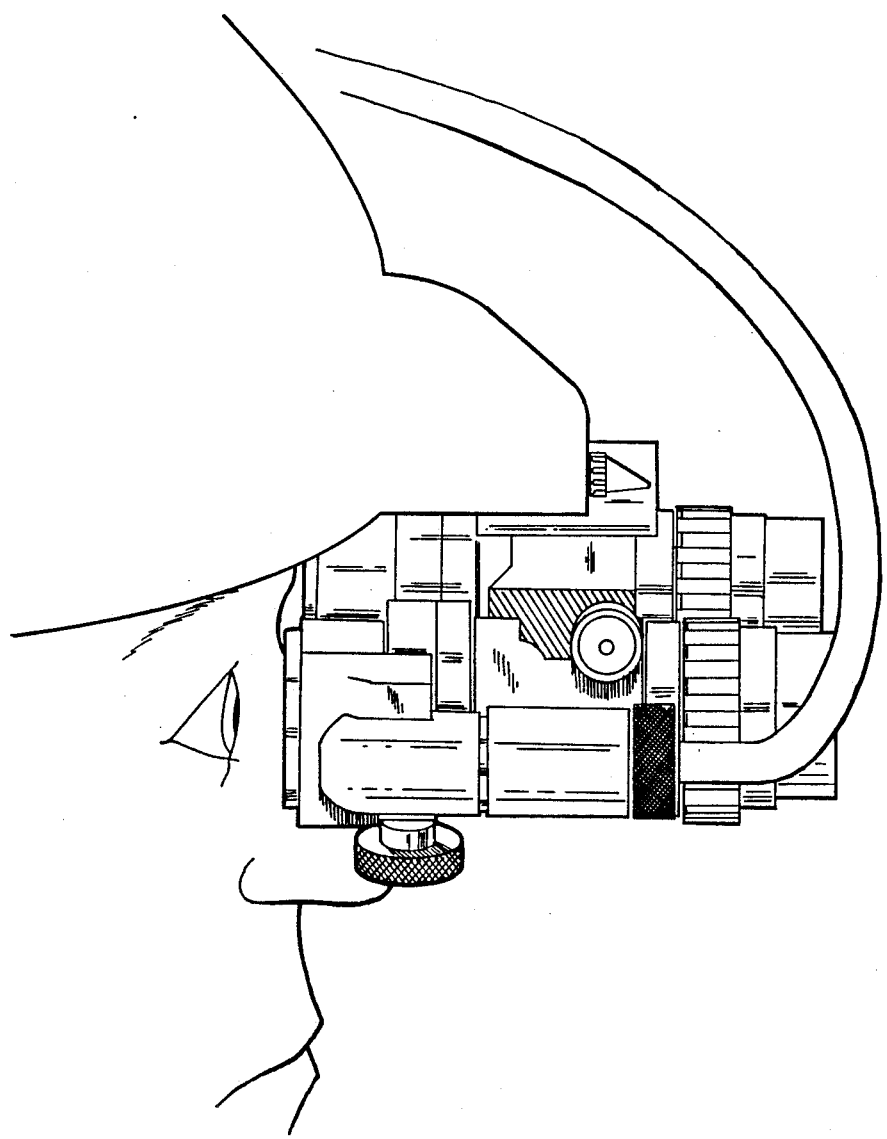

A housing 60, as shown in FIG. 2, provides cover and protection for the beam expander 37, the prism 40 and the focusing optics 41–43. This housing 60 is secured to the outer case 65 of the eyepiece 20 in airtight relation, and will thus move with the eyepiece during focusing.

A turret 62 is provided with ball detents to accept and hold the end 63 of the fiber optic cable 35 tight against the beam expander or taper 37 while permitting quick release of the cable when required by the pilot or observer for rapid egress from the aircraft.

The modified eyepiece assembly 20 is supported on the main body 15 by a slotted outer shell 70, which is provided with an attachment ring 71 that screws on the eyepiece threads 72 of the main body 15. The outer shell 70 is locked in place with the existing locking ring 73. A slot 74 is provided in the side of the outer shell 70 for receiving the housing 60. This slot extends from the end of the shell to the attachment ring. A focusing knob 75 and a drive mechanism (not shown) mounted on the outer shell cooperate with focusing threads 76 on the case 65 to permit movement of the eyepiece toward and away from the intensified image.

The beam combiner 45 is placed as close as possible to the front or eye side of lens 52 to permit maximum forward motion of the eyepiece 20 toward the night vision goggles image plane, which is on the face 27a of twister 27. Movement of the case 65 to the rear will achieve the +2 diopter adjustment requirement while forward focus adjustment will provide a maximum −2 diopters, limited primarily by the interference of the housing elbow containing the heads-up display imagery focusing optics with the threaded ring 71.

The case 65 forms a snug but slip fit within the outer shell 70, and is provided with a neoprene "O" ring 80 to form a seal with the main housing 15. This seal must be capable of retaining the dry nitrogen gas, which is at atmospheric pressure, that is used to keep moisture out of the optical system.

Both outer shell and inner optical housing are made of a glass loaded injection moldable material (such as the material sold under the tradename Ultem) with high strength and low thermal expansion characteristics. The case 65 and the housing 60 and the turret that holds the fiber optic cable input, are made from a split shell which are hermetically sealed after lens installation and assembly.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. In a night vision goggle including an objective lens, an image intensifier receiving an image focused thereon by the objective lens, an eyepiece having an outer lens for focusing the image of said image intensifier on the eye, the improvement comprising means for introducing an additional image for viewing by the operator at the same focus as the intensified image, including means for displaying the additional image, and image combiner means placed between the image intensifier and the eyepiece outer lens for combining said additional image with the intensified image.

2. An attachment for an existing night vision goggle assembly for including a heads-up display of additional information at the same focus as the operator is viewing an intensified image, wherein the goggles include a housing, a pair of objective lenses, image intensifiers for receiving the image in the field of view focused thereon by said objective lenses, and a pair of eyepiece housings each including at least an outer lens for directing the intensified image into the eyes of the wearer, said attachment including means for modifying at least one of said eyepiece housings to include an image combiner positioned within the boundaries of the housing, means for generating an image of additional information to be presented to the wearer, said image generating means being positioned with respect to said image combiner thereby to present the additional image to the wearer at the same focus as the intensified image.

3. An attachment for an existing night goggle assembly for presenting a heads-up display of additional information at the same focus and in the same field of view as the intensified image generated by the night vision goggles, wherein the goggles include a pair of objective lenses, a pair of image intensifiers for receiving the images in the field of view focused thereon by said objective lenses, and a pair of eyepieces each including a housing containing an inner lens and an outer lens for directing the intensified image into the eyes of the wearer, said attachment including means for modifying at least one of said eyepieces to include a image combiner positioned between the eyepiece inner and outer lenses, means for generating a real image of additional information to be prsented to the wearer, and focusing means for presenting said additional image to the wearer at the same focus and in the same field of view as the intensified image.

4. The attachment of claim 3 wherein said focusing means includes at least one lens positioned between said additional image and said beam combiner.

* * * * *